United States Patent
Chan et al.

(10) Patent No.: US 10,013,622 B2
(45) Date of Patent: Jul. 3, 2018

(54) REMOVING UNWANTED OBJECTS FROM A PHOTOGRAPH

(71) Applicant: INTERNATIONAL BUSINESS MACHINES CORPORATION, Armonk, NY (US)

(72) Inventors: Yuk L. Chan, Rochester, NY (US); Heidi Lagares-Greenblatt, Pittsburgh, PA (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 15/197,846

(22) Filed: Jun. 30, 2016

(65) Prior Publication Data

US 2018/0005063 A1    Jan. 4, 2018

(51) Int. Cl.
*G06K 9/62*   (2006.01)
*G06K 9/03*   (2006.01)
*G06K 9/46*   (2006.01)

(52) U.S. Cl.
CPC .......... *G06K 9/033* (2013.01); *G06K 9/46* (2013.01); *G06K 2207/1012* (2013.01)

(58) Field of Classification Search
CPC .......... G06K 9/00677; G06K 9/00295; G06K 9/00228; G06K 9/0075; G06K 9/00765; G06K 9/033; G06K 9/46; G06K 9/48; G06K 2207/1012; G06F 17/30241
See application file for complete search history.

(56) References Cited

U.S. PATENT DOCUMENTS

| | | | |
|---|---|---|---|
| 7,920,072 B2 * | 4/2011 | Smith | G06F 17/30241 340/10.1 |
| 8,237,743 B2 * | 8/2012 | Csurka | A63F 13/10 345/619 |
| 8,319,797 B2 * | 11/2012 | Swanson | H04N 5/272 345/634 |
| 8,768,070 B2 | 7/2014 | Gelfand et al. | |
| 9,117,134 B1 | 8/2015 | Geiss et al. | |
| 9,286,707 B1 | 3/2016 | Switkin | |

(Continued)

OTHER PUBLICATIONS

Disclosed Anonymously "Removing undesirable objects from photos", IP.com No. IPCOM000143880D; Publication Date: Dec. 12, 2006; 6 pgs.

(Continued)

*Primary Examiner* — Ali Bayat
(74) *Attorney, Agent, or Firm* — Cantor Colburn LLP; William A. Kinnaman, Jr.

(57) ABSTRACT

Methods, systems and computer program products for removing unwanted objects from a photograph are provided. Aspects include identifying a plurality of objects in the photograph and classifying each of the plurality of objects as one of a static object and a dynamic object. Aspects also include removing one or more of the plurality of objects classified as dynamic objects from the photograph and identifying one or more additional photographs, which include one or more of the plurality of objects classified as static objects. Aspects further include integrating content from at least one of the one or more additional photographs in a location of the removed dynamic objects in the photograph.

19 Claims, 5 Drawing Sheets

(56) References Cited

U.S. PATENT DOCUMENTS 9,699,380 B2 * 7/2017 Somanath .......... H04N 5/23238
2016/0086108 A1 * 3/2016 Abelow .............. G06Q 10/067
705/7.29

OTHER PUBLICATIONS

Hays et al., "Scene Completion Using Millions of Photographs", Communications of the ACM, vol. 51, No. 10, Oct. 2008; pp. 87-97.
Levy et al., "Use of Server Based Photo Database to Remove Unwanted Artifacts from a Photo Taken on Mobile Device", IP.com No. IPCOM00172774D; Publication Date: Jul. 14, 2008; 4 pgs.
Pageplus X3 Publisher Professional "User Guide" Serif, 2008; 272 pgs.

* cited by examiner

REMOVING UNWANTED OBJECTS FROM A PHOTOGRAPH

BACKGROUND

The present invention generally relates to editing photographs, and more particularly to removing unwanted object from a photograph.

With the advent of smartphones people are taking more and more pictures. However, often the pictures that they take may include both desired and undesired content. For example, a person may take a picture of a loved one in front of landmark but the picture also includes many other individuals that the user does not know. Many times people do not want to have unwanted objects or individuals in their pictures. Other times, people would like to take photographs of landmarks without having people or cars (moving objects) blocking the main sites.

Therefore, heretofore unaddressed needs still exist in the art to address the aforementioned deficiencies and inadequacies.

SUMMARY

In accordance with an embodiment, a method for removing unwanted objects from a photograph is provided. The method includes identifying a plurality of objects in the photograph and classifying each of the plurality of objects as one of a static object and a dynamic object. The method also includes removing one or more of the plurality of objects classified as dynamic objects from the photograph and identifying one or more additional photographs which include one or more of the plurality of objects classified as static objects. The method further includes integrating content from at least one of the one or more additional photographs in a location of the removed dynamic objects in the photograph.

In another embodiment of the invention, a processing system for removing unwanted objects from a photograph includes a processor configured to identify a plurality of objects in the photograph, classify each of the plurality of objects as one of a static object and a dynamic object, and remove one or more of the plurality of objects classified as dynamic objects from the photograph. The processor is further configured to identify one or more additional photographs which include one or more of the plurality of objects classified as static objects and integrate content from at least one of the one or more additional photographs in a location of the removed dynamic objects in the photograph.

In accordance with a further embodiment, a computer program product for removing unwanted objects from a photograph includes a non-transitory storage medium readable by a processing circuit and storing instructions for execution by the processing circuit for performing a method. The method includes identifying a plurality of objects in the photograph and classifying each of the plurality of objects as one of a static object and a dynamic object. The method also includes removing one or more of the plurality of objects classified as dynamic objects from the photograph and identifying one or more additional photographs which include one or more of the plurality of objects classified as static objects. The method further includes integrating content from at least one of the one or more additional photographs in a location of the removed dynamic objects in the photograph.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for removing unwanted objects from a photograph. In exemplary embodiments, unwanted objects depicted in a photograph are identified and removed. The unwanted objects can be identified by an individual, a processing system, or a combination of the two. Once the unwanted objects are identified, they are removed from the photograph and the background of the photograph, i.e., the area depicted behind the unwanted object, is identified. In exemplary embodiments, the background of the photograph is identified based on other photographs that are publically available or that are taken by the photographer of the original photograph. In exemplary embodiments, metadata such as the geotags can be used to determine additional photographs that can be used to complete the background of the photograph.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
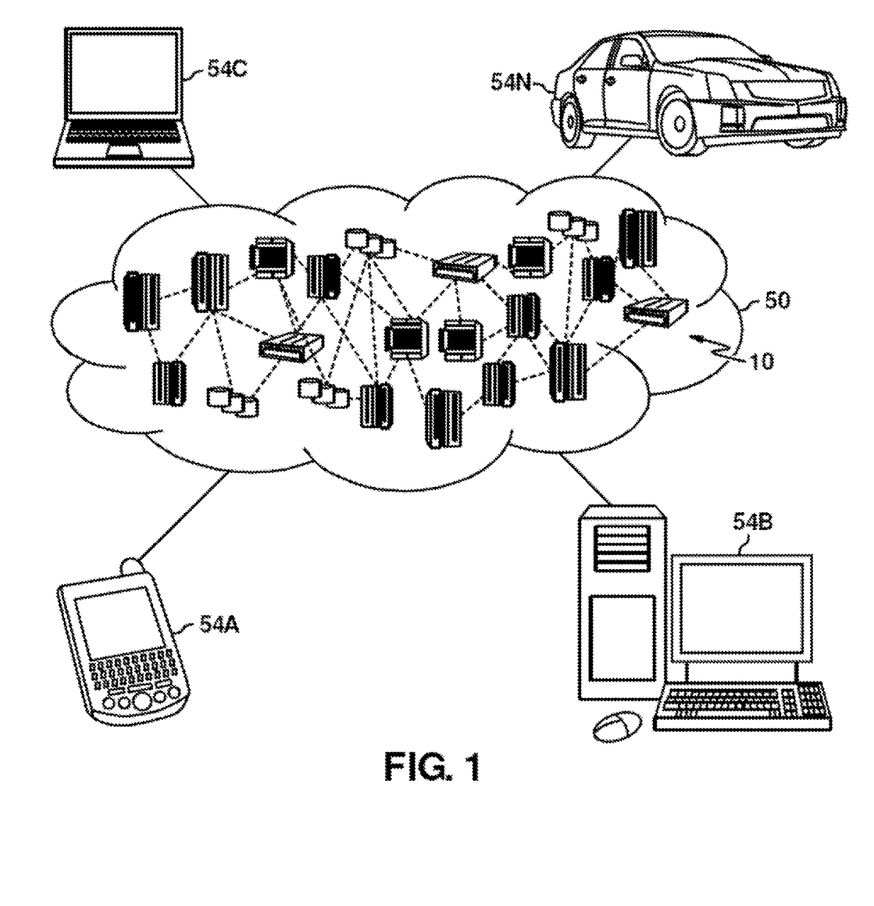
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
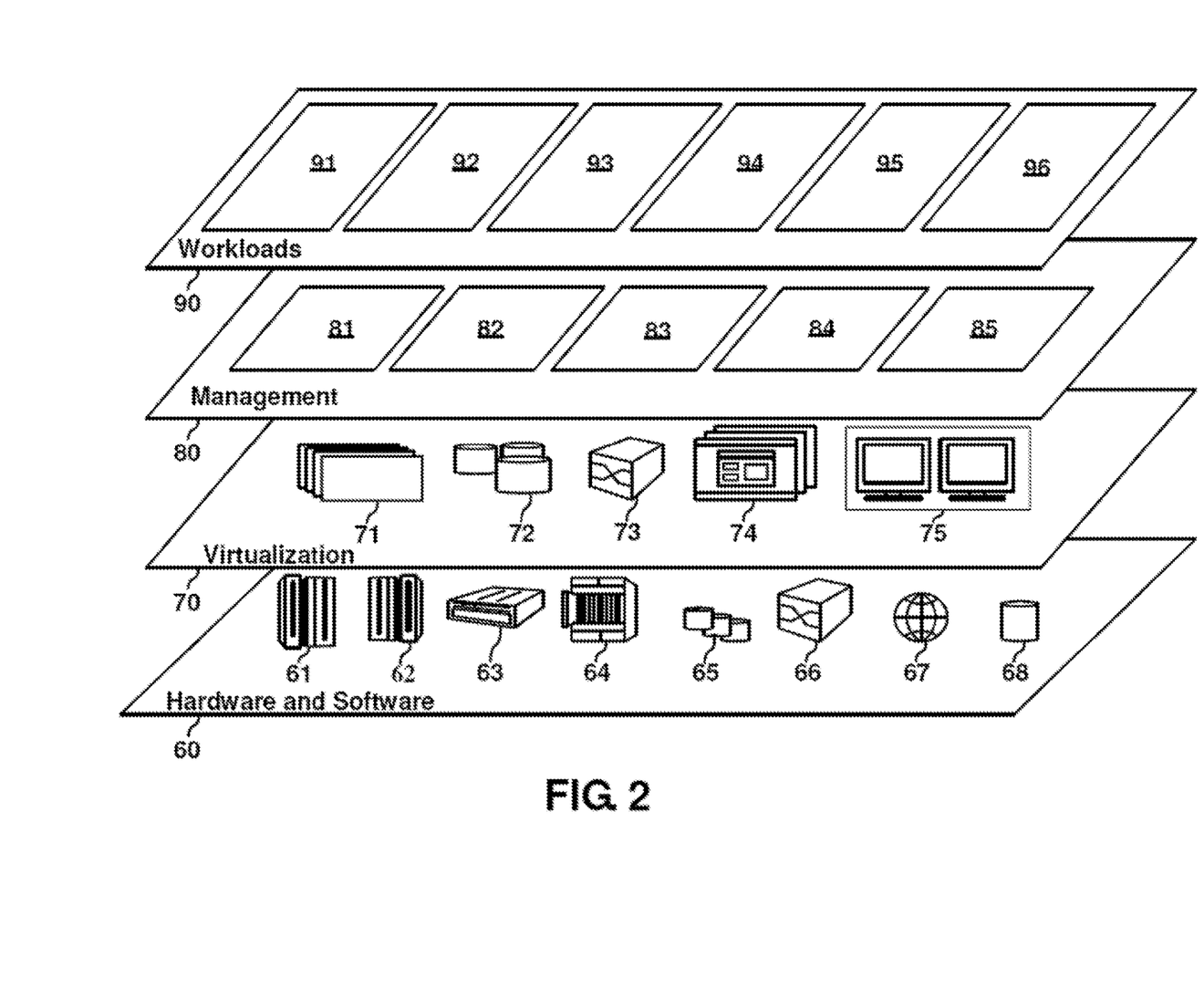
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and photograph editing 96.

Figure 3:
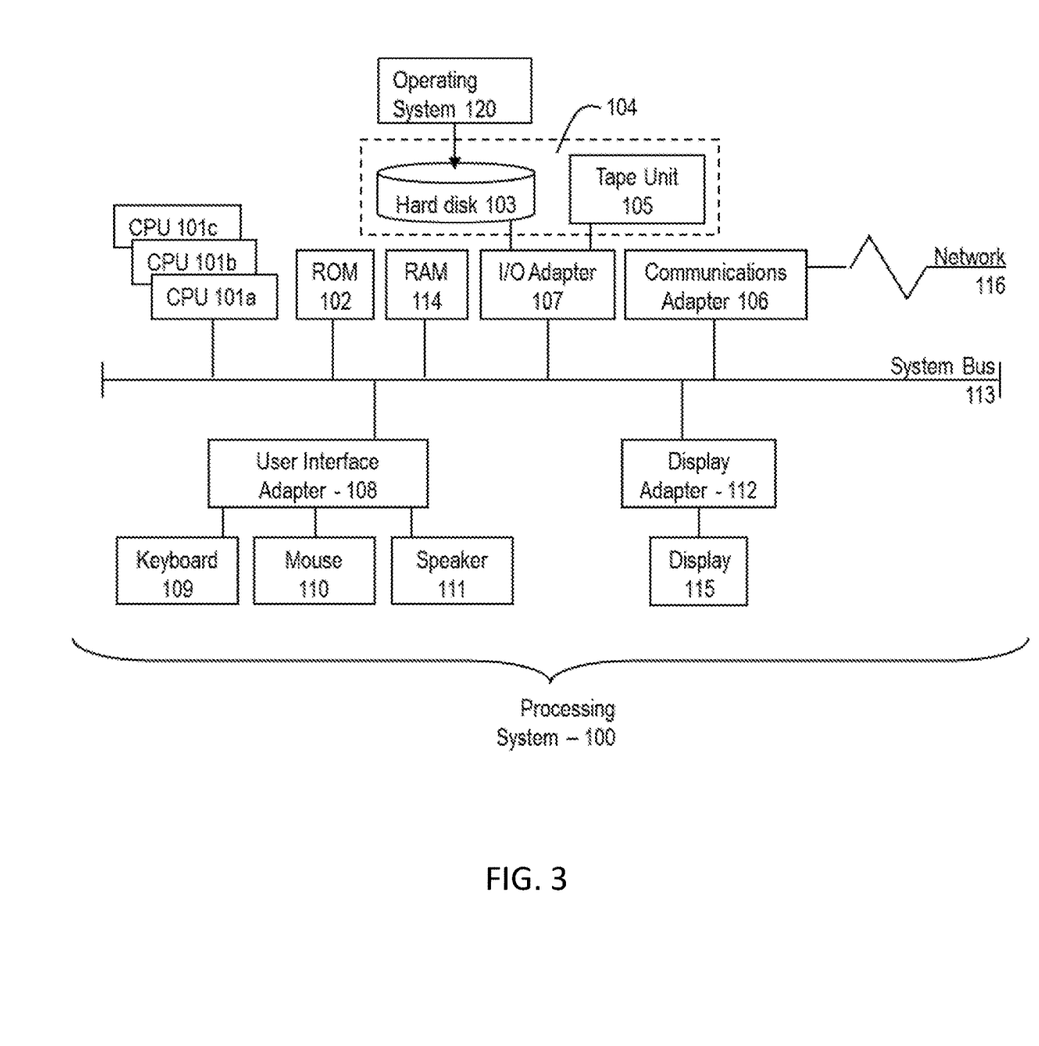
FIG. 3 is a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 3, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
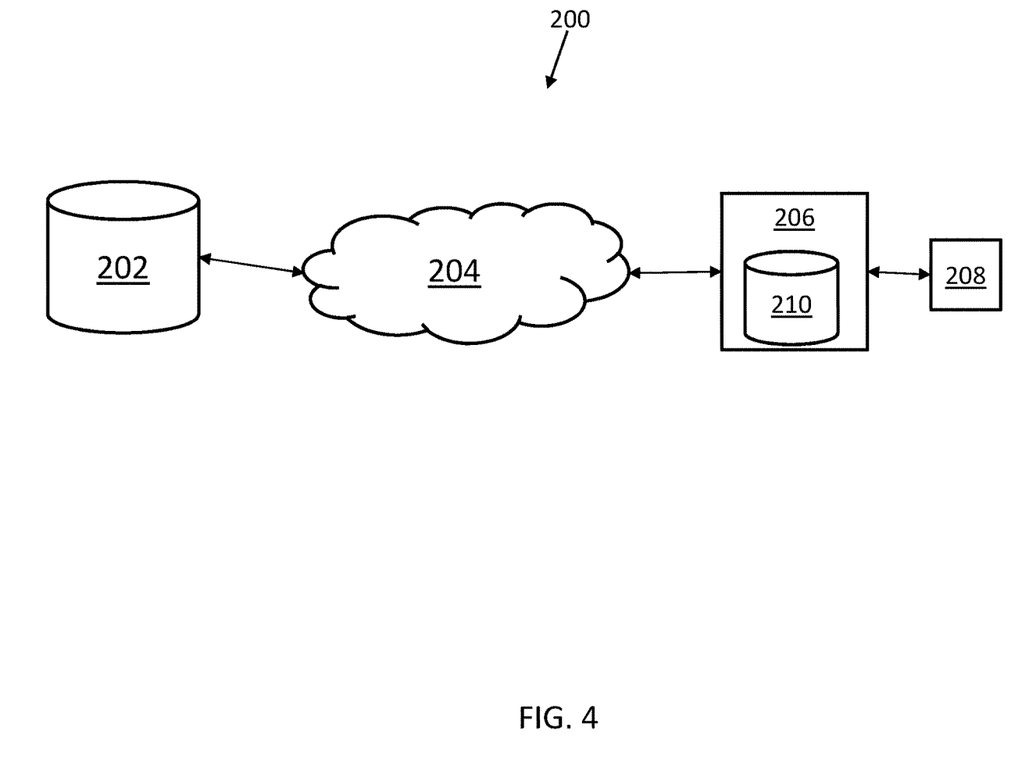
FIG. 4 is a block diagram illustrating a system for removing unwanted objects from a photograph in accordance with exemplary embodiments.

Referring now to FIG. 4, a system 200 for removing unwanted objects from a photograph in accordance with an embodiment is shown. As illustrated, the system 200 includes a camera 208 that is used to capture a photograph and a processing system 206 that is configured to edit the photograph. In one embodiment, the processing system 206 can be a processing system such as the one shown in FIG. 3 above. In another embodiment, the processing system 206 can be embodied in a smart phone, tablet or the like, which may include the camera 208. In exemplary embodiments, the camera 208 and/or processing system 206 includes a GPS sensor and is configured to attach metadata such as a geotag and timestamp to photographs as they are captured and saved.

The system 200 also includes an image database 202, which may be a public database, a private database, or a semi-private image database that is accessible by the processing system 206 via a communications network 204. The communications network 204 may include, but is not limited to, a cellular communications network, the Internet, a private network, and the like. In exemplary embodiments, the image database is used to store a plurality of images and metadata associated with the images. The image database 202 can include images stored on social network, individual cloud storage accounts, public repositories, and the like.

In exemplary embodiments, the processing system 206 is configured to search the image database 202, based on the metadata, to find appropriate images that can be used for a photograph stitching process. The processing system 206 can use both the metadata and a comparison of images to determine what photographs in the image database 202 are potential sources for image data needed to complete the background of a captured photograph.

In exemplary embodiments, the processing system 206 will use the metadata to get more information about the photograph (location, angles, local time, etc.). This way, the processing system 206 can search for similarly tagged photographs in order to get more photograph data to be used for the stitching the final photo. In exemplary embodiments, the processing system 206 will use weights to see which is the most common background of a subject to decide the background with the highest probability of being original. The processing system 206 will also compare angles, lights and metadata (i.e. geotags) to decide what is the most appropriate photograph for the stitching. The processing system 206 will analyze a cluster of photographs to decide what is needed for the areas removed.

Once the comparison is completed and background is decided, the processing system 206 will make sure that the stitching is done properly (the correct angles, contours, colors, etc.). Once the stitching of the static objects is done, then the processing system 206 will add the movable objects to the picture that the user selected to keep or chose to not remove (i.e., people who the user wants to keep in the picture on top of the landmark). In the case where a user or a camera takes multiple and/or continuous images of the same area, the processing system 206 can use the multiplicity of images for the stitching part of the process.

Figure 5:
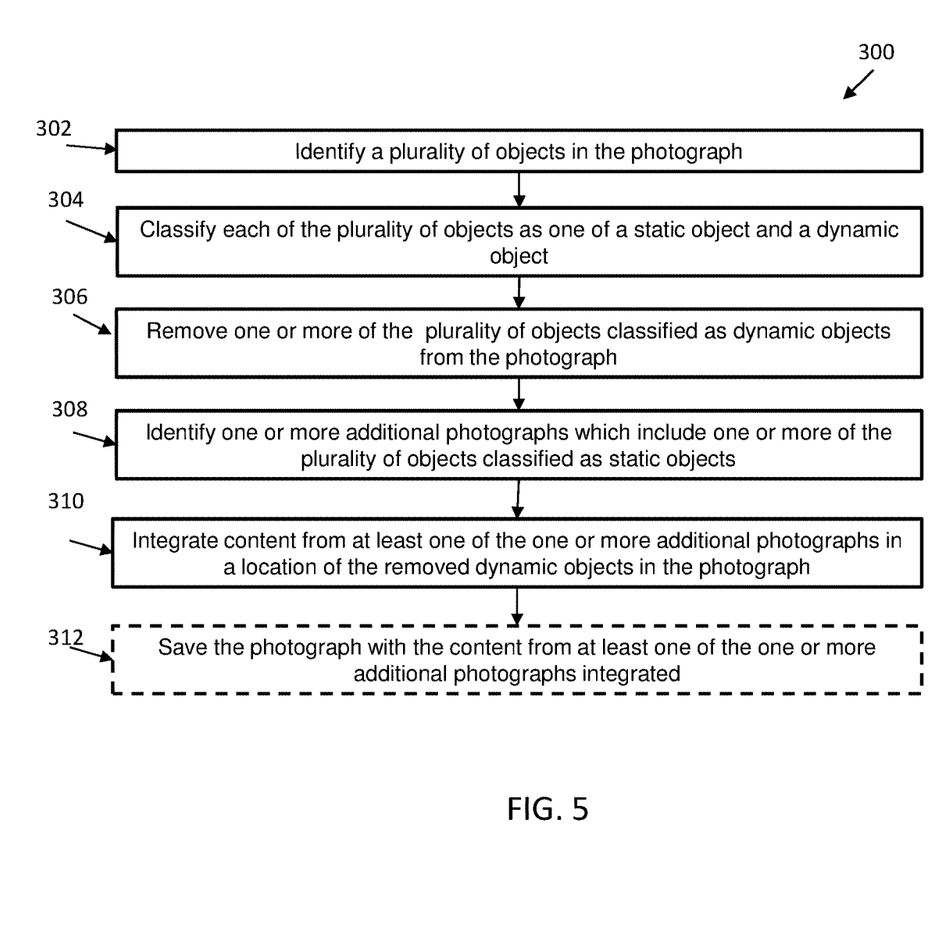
FIG. 5 shows a flow chart illustrating a method for removing unwanted objects from a photograph in accordance with an embodiment.

Referring now to FIG. 5, a method 300 for removing unwanted objects from a photograph is shown. As shown at block 302, the method 300 includes identifying a plurality of objects in the photograph. Next, as shown at block 304, the method 300 includes classifying each of the plurality of objects as one of a static object and a dynamic object. In exemplary embodiments, the object can be classified by determining the boundaries of an object and determining based on the boundaries if the shape of the object is typical of a moving object versus a static object. For example, the traditional shapes of a person, car, truck or other common dynamic objects can be identified and marked as dynamic objects.

As shown at block 306, the method 300 includes removing one or more of the plurality of objects classified as dynamic objects from the photograph. In one embodiment, the method 300 will automatically remove all dynamic objects from the photograph. In another embodiment, the method 300 will present the used with the objects that have been classified as dynamic objects so that the user can select which, if any, dynamic objects should not be removed. Next, as shown at block 308, the method 300 includes identifying one or more additional photographs that include one or more of the plurality of objects classified as static objects. As shown at block 310, the method 300 includes integrating content from at least one of the one or more additional photographs in a location of the removed dynamic objects in the photograph. In exemplary embodiments, integrating content from the at least one of the one or more additional photographs can be done using any known photograph stitching algorithm. The method 300 may also include saving the photograph with the content from at least one of the one or more additional photographs integrated, as shown at block 312.

In exemplary embodiments, a user has a photograph that includes unwanted objects and would like to remove those unwanted objects from the photograph. The user can either select the object they want to keep or select the unwanted objects they want to remove from the photograph, i.e., the user can first select to mark objects to be kept or deleted. Once the user selects one of these two options, the user is presented with the photograph to make selections of items to keep or remove. In exemplary embodiments, the photograph may include suggested marking for items to keep or remove. These suggested markings can be based on a variety of factors, which may include a facial recognition algorithm comparing people depicted in the photograph to individuals that are frequently photographed by the user. For example, a user may often select to remove strangers from photographs but may opt to keep family members or friends in photographs. In another example, a user may only select to keep a static item, such as a monument or building in a photograph In exemplary embodiments, a rank can be assigned to candidate photographs to determine which ones will be used in the photograph stitching process. The ranking is based on one or more of matching static object in the photographs, metadata associated with the photographs, a lighting condition of the photographs, a resolution of the photographs, and a camera zoom used to capture the photographs. In exemplary embodiments, the ranking can be further based on a determination of which candidate photographs contain the least number of dynamic objects. For example if two candidate photographs depict the same landmark from a desired angle, but one of the candidate photographs includes a higher number of dynamic objects, it will be assigned a lower ranking because it is less suitable for its use as patching a photo.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for removing unwanted objects from a photograph, the method comprising:
   identifying a plurality of objects in the photograph;
   classifying each of the plurality of objects as one of a static object and a dynamic object;
   removing one or more of the plurality of objects classified as dynamic objects from the photograph;
   identifying one or more additional photographs which include one or more of the plurality of objects classified as static objects; and
   integrating content from at least one of the one or more additional photographs in a location of the removed dynamic objects in the photograph, wherein the one or more additional photographs are selected based on a ranking of the one or more additional photographs, wherein the rankings are determined based on a number of dynamic objects in each of the one or more additional photographs.

2. The method of claim 1, wherein the photograph includes a geotag and wherein the geotag is used to identify the one or more additional photographs.

3. The method of claim 1, wherein the one or more additional photographs are received from at least one of a publically accessible database and a social network.

4. The method of claim 1, wherein the photograph and the one or more additional photographs are received from a single user.

5. The method of claim 1, wherein the at least one of the one or more additional photographs is selected based on a date and time stamp of the photograph and the one or more additional photographs.

6. The method of claim 1, wherein the at least one of the one or more additional photographs is selected based on a comparison of the one or more of the plurality of objects classified as static objects in the photograph and the one or more additional photographs.

7. The method of claim 6, wherein the comparison includes a similarity of one or more of:
   an orientation of the static objects in the photograph and the one or more additional photographs;
   a lighting condition of the photograph and the one or more additional photographs; and
   a resolution of the photograph and the one or more additional photographs.

8. The method of claim 1, further comprising
   marking the one or more of the plurality of objects classified as dynamic objects from the photograph and displaying the photograph to a user; and
   receiving an selection from the user of the one or more of the plurality of objects classified as dynamic objects to be removed from the photograph.

9. A computer program product for removing unwanted objects from a photograph, the computer program product comprising:
   a non-transitory storage medium readable by a processing circuit and storing instructions for execution by the processing circuit for performing a method comprising:
   identifying a plurality of objects in the photograph;
   classifying each of the plurality of objects as one of a static object and a dynamic object;
   removing one or more of the plurality of objects classified as dynamic objects from the photograph;
   identifying one or more additional photographs which include one or more of the plurality of objects classified as static objects; and
   integrating content from at least one of the one or more additional photographs in a location of the removed dynamic objects in the photograph, wherein the one or more additional photographs are selected based on a ranking of the one or more additional photographs, wherein the rankings are determined based on a number of dynamic objects in each of the one or more additional photographs.

10. The computer program product of claim 9, wherein the photograph includes a geotag and wherein the geotag is used to identify the one or more additional photographs.

11. The computer program product of claim 9, wherein the one or more additional photographs are received from at least one of a publically accessible database and a social network.

12. The computer program product of claim 9, wherein the photograph and the one or more additional photographs are received from a single user.

13. The computer program product of claim 9, wherein the at least one of the one or more additional photographs is selected based on a date and time stamp of the photograph and the one or more additional photographs.

14. The computer program product of claim 9, wherein the at least one of the one or more additional photographs is selected based on a comparison of the one or more of the plurality of objects classified as static objects in the photograph and the one or more additional photographs.

15. The computer program product of claim 14, wherein the comparison includes a similarity of one or more of:
   an orientation of the static objects in the photograph and the one or more additional photographs;
   a lighting condition of the photograph and the one or more additional photographs; and
   a resolution of the photograph and the one or more additional photographs.

16. The computer program product of claim 9, further comprising
 marking the one or more of the plurality of objects classified as dynamic objects from the photograph and displaying the photograph to a user; and
 receiving an selection from the user of the one or more of the plurality of objects classified as dynamic objects to be removed from the photograph.

17. A processing system for removing unwanted objects from a photograph including a processor configured to control content displayed on a display screen, the processor configured to:
 identify a plurality of objects in the photograph, wherein the photograph includes a geotag;
 classify each of the plurality of objects as one of a static object and a dynamic object;
 receive a selection from a user of the one or more of the plurality of objects classified as dynamic objects to be removed from the photograph;
 remove one or more of the plurality of objects classified as dynamic objects from the photograph;
 identify one or more additional photographs which include one or more of the plurality of objects classified as static objects, wherein the photograph and the one or more additional photographs are received from a single user; and
 integrate content from at least one of the one or more additional photographs in a location of the removed dynamic objects in the photograph, wherein the one or more additional photographs are selected based on a ranking of the one or more additional photographs, wherein the rankings are determined based on a number of dynamic objects in each of the one or more additional photographs.

18. The processing system of claim 17, wherein the at least one of the one or more additional photographs is selected based a comparison of the one or more of the plurality of objects classified as static objects in the photograph and the one or more additional photographs.

19. The processing system of claim 18, wherein the comparison includes a similarity of one or more of:
 an orientation of the static objects in the photograph and the one or more additional photographs;
 a lighting condition of the photograph and the one or more additional photographs; and
 a resolution of the photograph and the one or more additional photographs.

* * * * *